US012639012B2

(12) United States Patent
Kim et al.

(10) Patent No.: US 12,639,012 B2
(45) Date of Patent: **\*May 26, 2026**

(54) DATA STORAGE DEVICE AND OPERATING METHOD THEREOF

(71) Applicant: SK hynix Inc., Icheon-si (KR)

(72) Inventors: Hyun Tae Kim, Icheon-si (KR); So Yoon Jung, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,341

(22) Filed: Nov. 26, 2024

(65) Prior Publication Data

US 2025/0094088 A1 Mar. 20, 2025

Related U.S. Application Data

(63) Continuation of application No. 17/522,767, filed on Nov. 9, 2021, now Pat. No. 12,169,645.

(30) Foreign Application Priority Data

May 24, 2021 (KR) ........................ 10-2021-0066072

(51) Int. Cl.
*G06F 3/06* (2006.01)
*G06F 12/0871* (2016.01)
*G06F 12/0873* (2016.01)

(52) U.S. Cl.
CPC .......... *G06F 3/0659* (2013.01); *G06F 3/0611* (2013.01); *G06F 3/0634* (2013.01);
(Continued)

(58) Field of Classification Search
CPC .... G06F 3/0659; G06F 3/0611; G06F 3/0634; G06F 3/0644; G06F 3/0673;
(Continued)

(56) References Cited

U.S. PATENT DOCUMENTS 6,631,446 B1 10/2003 Cherkauer et al.
2016/0092128 A1 3/2016 Jain et al.
(Continued)

FOREIGN PATENT DOCUMENTS

JP 2009076025 A 4/2009
KR 101989018 B1 6/2019
(Continued)

OTHER PUBLICATIONS

Request for the Submission of an Opinion for KR Appl. No. 10-2021-0066072, mailed on Nov. 12, 2025, 21 pages with English translation.
(Continued)

*Primary Examiner* — Janice M. Girouard
(74) *Attorney, Agent, or Firm* — Perkins Coie LLP

(57) ABSTRACT

A data processing system is provided to include a storage unit and a controller in communication with the storage unit and configured to program write data to a first area as at least one of the plurality of storage areas with a priority over a second area as at least one of the plurality of storage areas and transfer data of the first area to the second area. The controller is further configured to adjust a size of the first area based on 1) a number of times saturated by the write data for the first area, a saturation occurring due to a size of the write data written to the first area being greater than a certain size and 2) an overflow size of the write data corresponding to a difference between the size of the write data and the certain size.

19 Claims, 12 Drawing Sheets

(52) U.S. Cl.
     CPC .......... *G06F 3/0644* (2013.01); *G06F 3/0673*
               (2013.01); *G06F 3/0629* (2013.01); *G06F*
            *12/0871* (2013.01); *G06F 12/0873* (2013.01);
                              *G06F 2212/1044* (2013.01)
(58) Field of Classification Search
     CPC .............. G06F 3/0629; G06F 12/0871; G06F
                           12/0873; G06F 2212/1044
     See application file for complete search history.

(56)                   References Cited

U.S. PATENT DOCUMENTS

2016/0364337 A1 *  12/2016  Hale ................... G06F 12/0897
2019/0250858 A1     8/2019  Yun
2020/0004446 A1     1/2020  Palmer et al.
2021/0034514 A1     2/2021  Cho et al.
2022/0374172 A1    11/2022  Kim et al.
2022/0374216 A1    11/2022  Sugawara et al.

FOREIGN PATENT DOCUMENTS

KR        20200110547 A      9/2020
KR        20210016227 A      2/2021

OTHER PUBLICATIONS

Decision to Grant a Patent for JP Appl. No. 2022-077033, mailed on
Jan. 27, 2026, 5 pages with English translation.

* cited by examiner

FIG. 6

DATA STORAGE DEVICE AND OPERATING METHOD THEREOF

CROSS-REFERENCES TO RELATED APPLICATION

This patent document is a continuation of U.S. patent application Ser. No. 17/522,767, filed on Nov. 9, 2021, which claims the priority and benefits of Korean application number 10-2021-0066072, filed on May 24, 2021, which are incorporated herein by reference in their entireties.

TECHNICAL FIELD

Various embodiments generally relate to a semiconductor integrated apparatus, and more particularly, to a data storage device and an operating method thereof.

BACKGROUND

A data storage device uses a volatile or nonvolatile memory device as a storage medium, and performs a data input/output operation at the request of a host device.

An example of the data storage medium may include storage devices using flash memory devices. With an increase in capacity and an improvement in price competitiveness due to the technical development of the flash memory device, not only PCs or mobile devices, but also data centers, which handle large-capacity data, employ storage devices using flash memory devices.

SUMMARY

In one aspect, a data storage device is provided to include: a storage unit including a plurality of storage areas; and a controller configured to program write data to a first area as at least one of the plurality of storage areas with a priority over a second area as at least one of the plurality of storage areas, and to move data of the first area to the second area for storage, wherein the controller is configured to adjust a size of the first area on the basis of the number of saturations of the first area by one-time write data and overflow sizes of the write data.

In another aspect, a data storage device is provided to include: a storage unit configured to store data and including a plurality of storage area; and a controller in communication with the storage unit and configured to program write data to a first area as at least one of the plurality of storage areas with a priority over a second area as at least one of the plurality of storage areas and transfer data of the first area to the second area. The controller is further configured to adjust a size of the first area based on 1) a number of times saturated by the write data for the first area, a saturation occurring due to a size of the write data written to the first area being greater than a certain size and 2) an overflow size of the write data corresponding to a difference between the size of the write data and the certain size.

In another aspect, a data storage device is provided to include: a storage unit including a plurality of logical areas and buffer areas dedicated to high-speed program units of the plurality of logical areas; and a controller configured to program write data in the buffer area with a priority over the high-speed program unit in response to a write request of a host device, to detect the number of times, by which write data having a size exceeding a size of the buffer area is provided, and an excess amount for each high-speed program unit, and to change a size of the buffer area.

In another aspect, a data storage device is provided to include: a storage area including logical areas and buffer areas associated with the logical areas; and a controller in communication with a host device to receive a request to write data for the logical areas and configured to program the data in the buffer areas with a priority over the logical areas and change a size of a buffer area based on a number of times that a corresponding data programmed to the buffer area has a size exceeding a size of the buffer area and a difference between the corresponding data programmed to the buffer area and the size of the buffer area.

In another aspect, an operating method of a data storage device is provided to include: a step in which a storage unit including a plurality of storage areas is prepared; a step in which a controller controlling the storage unit programs write data to a first area as at least one of the plurality of storage areas with a priority over a second area as at least one of the plurality of storage areas; a step in which the controller moves data of the first area to the second area for storage; and a step in which the controller adjusts a size of the first area on the basis of the number of saturations of the first area by one-time write data and overflow sizes of the write data.

In another aspect, an operating method of a data storage device is provided to include: controlling a storage unit to program write data to a first area of a storage unit with a priority over a second area of the storage unit; transferring data of the first area to the second area; and adjusting a size of the first area based on a number of saturations occurring in the first area and an overflow size of the write data.

A data storage device in accordance with an embodiment of the present technology may include: a storage unit including a plurality of storage areas including a first area and a second area; and a controller in communication with a host device and configured to program write data to the first area with a priority over the second area and transfer data of the first area to the second area, wherein the controller is configured to transmit, to the host device, a number of saturations of the first area, a saturation occurring due to a size of the write data written to the first area being greater than a certain size and an overflow size of the write data corresponding to a difference between the size of the write data and the certain size.

BRIEF DESCRIPTION OF THE DRAWINGS

FIG. 6 is a diagram for explaining a write buffer manager in accordance with an embodiment of the disclosed technology.

DETAILED DESCRIPTION

Many studies have been performed to address issues caused from a difference in an operating speed between the host device and the data storage device. For example, data to be written may be buffered in a storage medium by a high-speed write operation and then moved to another area of the storage medium, for example, a user data area. Some implementations of the disclosed technology provide a data storage device that can efficiently manage an area for write data.

Hereinafter, embodiments of the disclosed technology will be described in more detail with reference to the accompanying drawings.

Figure 1:
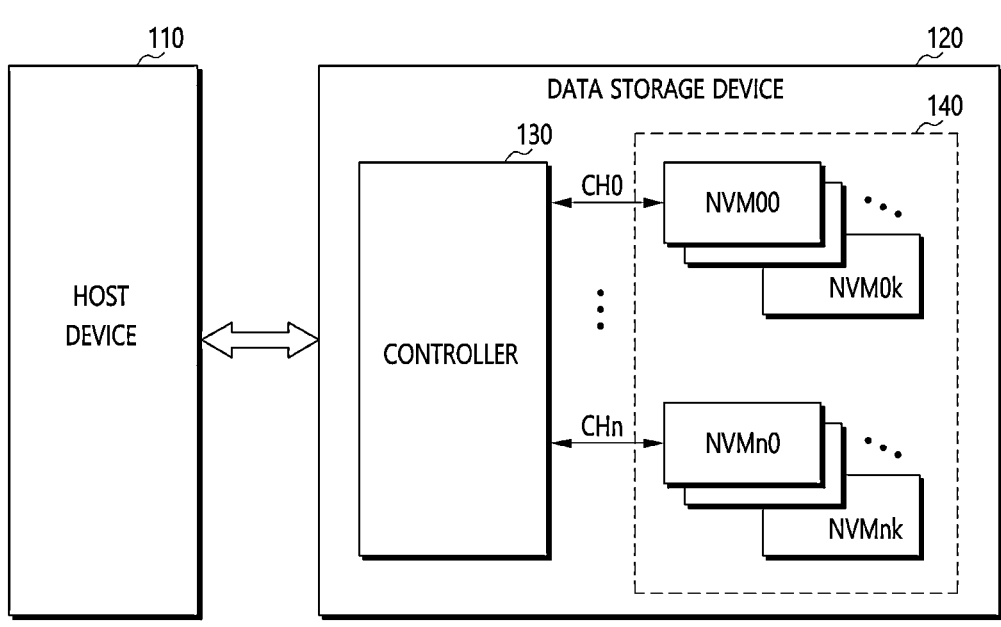
FIG. 1 is a configuration diagram of a data processing system in accordance with an embodiment of the disclosed technology.

FIG. 1 is a configuration diagram of a data processing system 100 in accordance with an embodiment of the disclosed technology.

Referring to FIG. 1, the data processing system 100 may include a host device 110 and a data storage device 120.

Examples of The host device 110 include, for example, portable electronic devices such as mobile phones and MP3 players, personal electronic devices such as laptop computers, desktop computers, game machines, TVs, and beam projectors, or electronic devices for processing large-capacity data such as workstations and servers. The host device 110 may serve as a master device with respect to the data storage device 120.

The data storage device 120 is configured to operate in response to a request from the host device 110. The data storage device 120 is configured to store data that is accessed by the host device 110. Thus, the data storage device 120 may be used as a main storage device or an auxiliary storage device of the host device 110. The data storage device 120 may include a controller 130 and a storage unit 140. The controller 130 may serve as a master device with respect to the storage unit 140. The controller 130 and the storage unit 140 may be configured as memory cards electrically connected to the host device 110 through various interfaces. Alternatively, the controller 130 and the storage unit 140 may be configured as solid state drives (SSDs).

The controller 130 is configured to control the storage unit 140 in response to a request from the host device 110. For example, the controller 130 is configured to provide the host device 110 with data read from the storage unit 140, or configured to store data provided from the host device 110 in the storage unit 140. For such an operation, the controller 130 is configured to control read, program (or write), and erase operations of the storage unit 140.

The storage unit 140 may be electrically connected to the controller 130 through one or more channels CH0 to CHn, and may include one or more nonvolatile memory devices NVM00 to NVM0k and NVMn0 to NVMnk. In an embodiment, the nonvolatile memory devices NVM00 to NVM0k and NVMn0 to NVMnk may be configured as at least one of various types of nonvolatile memory devices such as a NAND flash memory device, a NOR flash memory device, a ferroelectric random access memory (FRAM) using a ferroelectric capacitor, a magnetic RAM (MRAM) using a tunneling magneto-resistive (TMR) film, a phase change memory device (PRAM) using chalcogenide alloys, and a resistive memory device (RERAM) using a transition metal oxide.

Each of the nonvolatile memory devices NVM00 to NVM0k and NVMn0 to NVMnk includes a plurality of memory cells. Each of the memory cells may operate as a single level cell (SLC) capable of storing one bit of data or a multi-level cell (MLC) capable of storing two bits or more of data.

Each of the nonvolatile memory devices NVM00 to NVM0k and NVMn0 to NVMnk may be configured to operate as a single level cell (SLC) memory device or as a multi-level cell (MLC) memory device. Alternatively, among the nonvolatile memory devices NVM00 to NVM0k and NVMn0 to NVMnk, some may be configured to operate as single level cell (SLC) memory devices or the others may be configured to operate as multi-level cell (MLC) memory devices.

In an embodiment, the controller 130 may provide a write booster function in order to respond to a request from the host device 110 at a high speed. The write booster function refers to the function of programming write data, which is received from the host device 110, in a high-speed programmable buffer area with a priority over a user area.

In order to provide the write booster function, the data storage device 120 may be divided into a first area including a write booster buffer WBB and a second area including the user area.

When the write booster function is activated, the controller 130 may write the write data received from the host device 110 in the write booster buffer WBB included in the first area. Thus, when writing the write data, the write booster buffer WBB included in the first area has a priority over the user area included in the second area. Thereafter, the controller 130 may flush or migrate the data programmed to the write booster buffer WBB to the second area including the user area, according to a command from the host device 110 or various internal policies set by the controller 130. The controller 130 can improve a write speed by controlling the program operation for the first area to be performed at a higher speed than the program operation for the second area.

Figure 2:
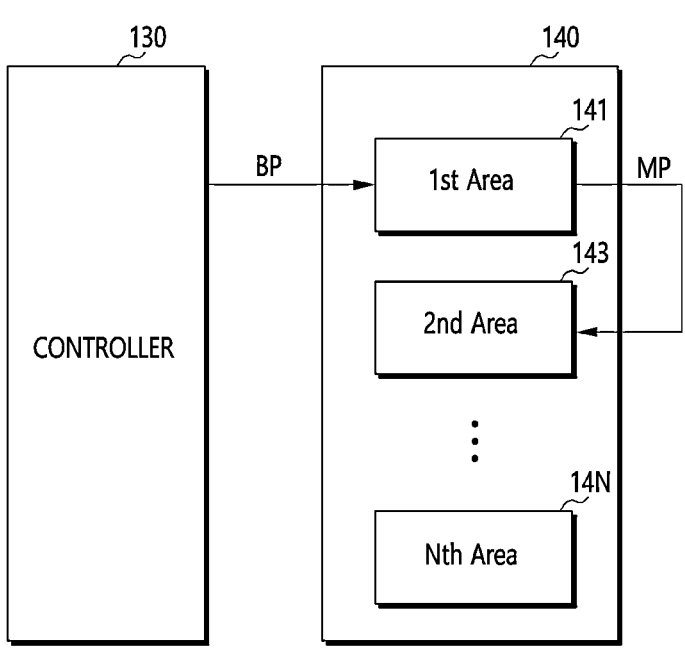
FIG. 2 is a diagram for explaining a write booster function in accordance with an embodiment of the disclosed technology.

FIG. 2 is a diagram for explaining the write booster function in accordance with an embodiment.

Referring to FIG. 2, the physical storage space of the storage unit 140 may be divided into $1^{st}$ to $N^{th}$ areas 141, 143, . . . , 14N, whereby N is a positive natural number greater than 1. Although FIG. 2 shows that the physical storage space of the storage unit 140 includes at least three areas 141, 143, 14N (i.e., N becomes 3 in the implementation as shown in FIG. 2), other implementations are also possible. The $1^{st}$ to $N^{th}$ areas 141, 143, . . . , 14N may have different number of bits storable per cell that is logically varied according to management (for example, address mapping) of the controller 130. In an embodiment, the $1^{st}$ area 141 may be a part of the physical storage space of the storage unit 140. Each of other areas 143, . . . , 14N, except for the $1^{st}$ area 141, may be a part or all of the rest of the physical storage space of the storage unit 140.

When the write booster function is activated, the number of bits storable per cell of memory cells belonging to some of the $1^{st}$ to $N^{th}$ areas 141, 143, . . . , 14N may be smaller than that of memory cells belonging to other areas.

In an embodiment, the number of bits storable per cell of memory cells belonging to the $1^{st}$ area 141 may be smaller than that of memory cells belonging to the $2^{nd}$ area 143. For example, each of the memory cells belonging to the $1^{st}$ area 141 may store one bit of data, and each of the memory cells belonging to the $2^{nd}$ area 143 may store two or more bits of data. Since the number of bits storable per cell of the $1^{st}$ area 141 is smaller than that of the $2^{nd}$ area 143, a program speed for the $1^{st}$ area 141 may be faster than that for the $2^{nd}$ area 143.

In accordance with implementation, each of the memory cells belonging to the $2^{nd}$ area 143 may store three bits or more of data, and each of the memory cells belonging to the $N^{th}$ area 14N may store N bits or more of data.

When the write booster function is activated, the controller 130 performs a buffer programming (BP) operation of preferentially programming write data provided from the host device 110 in the $1^{st}$ area 141, and transmits a response (program completion signal) for a write request to the host device 110. Thereafter, the controller 130 performs a main programming (MP) operation of moving (flushing or migrating) the data stored in the $1^{st}$ area 141 to an area, where the number of bits storable per cell is larger than that of the $1^{st}$ area 141, for example, the $2^{nd}$ area 143.

According to the write booster write operation, the response time to the write request of the host device 110 can be quicker, so that it is possible to improve the write performance of the data processing system 100.

In an embodiment, the physical storage space of the storage unit 140 may be divided into one or more logical units LU under the control of the master device such as the host device 110 or the controller 130. Each logical unit LU is an independent processing object that processes a command from the host device 110, and may also be referred to as a name space. In an embodiment, the host device 110 may configure the storage unit 140 into a plurality of logical units LUs, and request the controller 130 to perform a task for a specific logical unit LU. The controller 130 may access the storage unit 140 in units of logical units LUs by performing the task requested by the host device 110.

Depending on whether the logical units LUs share the write booster buffer WBB, the write booster mode can be either a shared buffer type write booster mode or a dedicated buffer type write booster mode. Thus, the write booster mode includes the shared buffer type write booster mode and the dedicated buffer type write booster mode according to the type in which the logical unit LU uses the write booster buffer WBB. The shared buffer type write booster mode allows the logical units LUs to share a write booster buffer WBB having a preset size. The dedicated buffer type write booster mode allows a logical unit LU to use an independent write booster buffer WBB for the logical unit LU.

Figure 3:
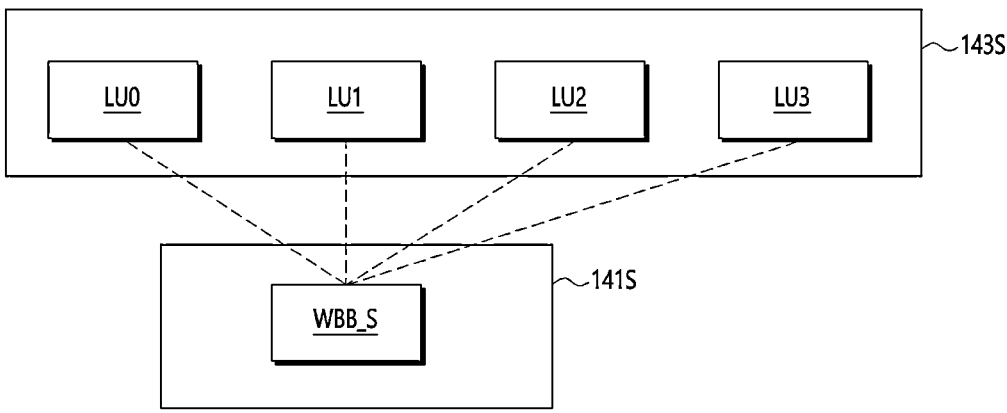
FIG. 3 is a diagram for explaining a shared buffer type write booster mode in accordance with an embodiment of the disclosed technology.

FIG. 3 is a diagram for explaining the shared buffer type write booster mode in accordance with an embodiment.

Referring to FIG. 3, a first area 141S may include a shared write booster buffer WBB_S and a second area 143S may include logical units LU0 to LU3. The plurality of logical units LU0 to LU3 may share the one write booster buffer WBB_S. When the write booster mode is activated and a write command for each of the logical units LU0 to LU3 is received, write data may be preferentially written in the shared write booster buffer WBB_S with the priority over the logical units LU0 to LU3. When the write booster mode is deactivated, write data for each of the logical units LU0 to LU3 may be written according to a normal write policy which programs write data without distinguishing the first area 141S and the second area 143S from each other. Thus, when the write booster mode is deactivated, write data for each of the logical units LU0 to LU3 may be written in each of the logical units LU0 to LU3 or the shared write booster buffer WBB_S according to the normal write policy.

Figure 4:
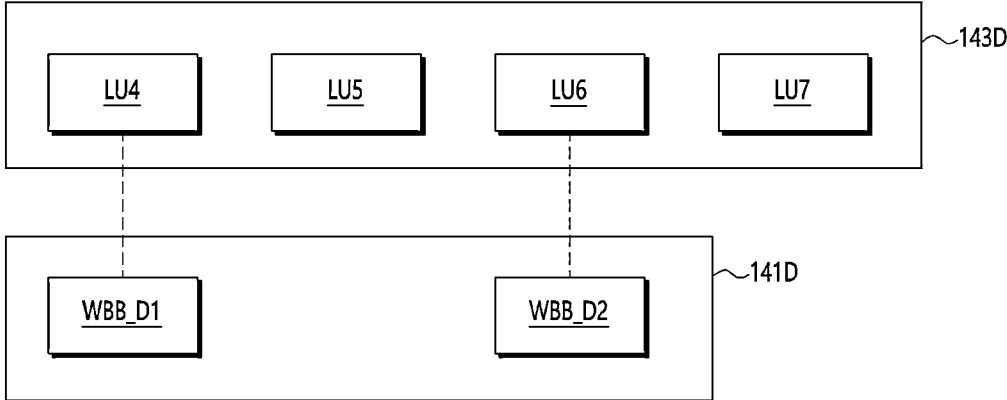
FIG. 4 is a diagram for explaining a dedicated buffer type write booster mode in accordance with an embodiment of the disclosed technology.

FIG. 4 is a diagram for explaining the dedicated buffer type write booster mode in accordance with an embodiment.

Referring to FIG. 4, a first area 141D may include dedicated write booster buffers WBB_D1 and WBB_D2 and a second area 143D may include logical units LU4 to LU7.

A dedicated write booster buffer may be independently or individually allocated to a high-speed program unit that is included in the plurality of logical units LU4 to LU7. In the example as shown in FIG. 4, among the plurality of logical units LU4 to LU7, the logical units LU4 and LU6 correspond to the high-speed program units. For example, the first dedicated write booster buffer WBB_D1 may be allocated to the fourth logical unit LU4, and the second dedicated write booster buffer WBB_D2 may be allocated to the sixth logical unit LU6.

As described above, in the dedicated buffer type, the write booster buffer may be allocated to at least some of the plurality of logical units LU4 to LU7, and the write booster buffers WBB_D1 and WBB_D2 allocated to the logical units may have variable sizes determined by the host device 110.

The master device, for example, the host device 110 may divide the physical storage space of the storage unit 140 into one or more logical units LU after initialization and booting of the data storage device 120. Furthermore, the host device 110 may determine the buffer type and whether to activate the write booster mode. When the dedicated buffer type is used, the host device 110 may determine which logical unit LU to set as a high-speed program unit and which size (data storage capacity) of a write booster buffer WBB to be allocated to the set logical unit LU. The size of the write booster buffer for each logical unit LU may be determined within the allowable total buffer size TOTAL_WBB of the write booster buffer WBB.

For example, when the total buffer size TOTAL_WBB is X, the first dedicated write booster buffer WBB_D1 having a size A may be allocated to the fourth logical unit LU4, and the second dedicated write booster buffer WBB_D2 having a size B of (X−A) may be allocated to the sixth logical unit LU6.

It is assumed that the size A of the first dedicated write booster buffer WBB_D1 is smaller than the size B of the second dedicated write booster buffer WBB_D2 (A<B) and a size C of write data included in an one-time write request to each of the fourth logical unit LU4 and the sixth logical unit LU6 is larger than A and smaller than B (A<C<B).

Since the size C of the write data included in the one-time write request to the fourth logical unit LU4 exceeds the size A of the first dedicated write booster buffer WBB_D1, some of the write data corresponding to the size A may be preferentially programmed to the first dedicated write booster buffer WBB_D1, but the remaining write data corresponding to the size C−A may be normally programmed (NP) to the fourth logical unit LU4.

On the other hand, since the size C of the write data included in the one-time write request to the sixth logical unit LU6 is smaller than the size B of the second dedicated write booster buffer WBB_D2, all of the write data may be preferentially programmed to the sixth logical unit LU6.

When such a situation occurs and repeats, an extra storage space that amounts to B−C in the second dedicated write booster buffer WBB_D2 allocated to the sixth logical unit LU6 becomes wasted. To avoid such situation and increase the performance of the write booster mode in relation to the write operation for the fourth logical unit LU4, some implementations of the disclosed technology suggest to adjust the sizes of the write booster buffers WBB_D1 and WBB_D2.

Figure 5:
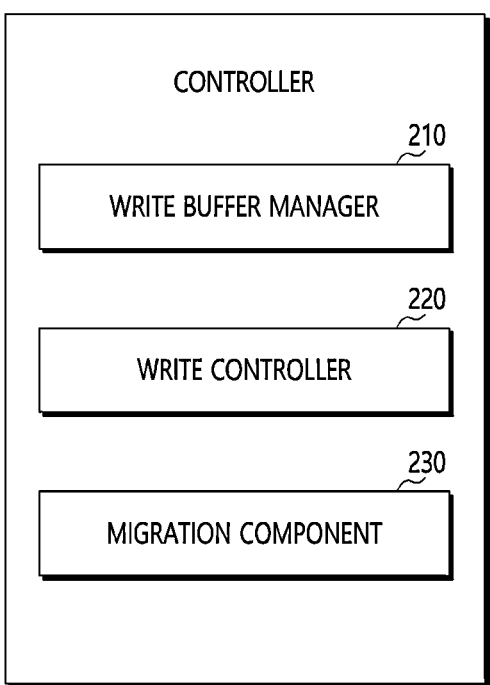
FIG. 5 is a configuration diagram of a controller in accordance with an embodiment of the disclosed technology.

FIG. 5 is a configuration diagram of the controller 130 in accordance with an embodiment of the disclosed technology.

Referring to FIG. 5, the controller 130 in accordance with an embodiment may include a write buffer manager 210, a write controller 220, and a migration component 230.

As the physical storage space of the storage unit 140 is divided into one or more logical units LU under the control of the host device 110, the write buffer manager 210 may set the buffer type and whether to activate the write booster mode under the control of the host device 110. When the dedicated buffer type is set, based on the control of the host device 110, the write buffer manager 210 may determine how to allocate the write booster buffer including to which logical unit LU the write booster buffer is allocated and which size (data storage capacity) of a write booster buffer WBB to be allocated to the logical unit LU. The size of the write booster buffer for each logical unit LU may be determined within the allowable total buffer size TOTAL_WBB.

When a write booster buffer WBB has been allocated to a logical unit LU for which a write request is received from the host device 110, the write controller 220 may preferentially program write data to the write booster buffer WBB. When the size of the write data exceeds the size of the write booster buffer WBB, the write controller 220 may perform a buffer programming operation to write some of the write data in the write booster buffer WBB, and may perform a normal programming operation to write the rest of the write data in a corresponding logical unit LU. The normal programming operation refers to a programming operation that is not the buffer programming operation. In such a case, the size of the buffer-programmed write data may be substantially the same as that of the write booster buffer WBB, and the size of the normally programmed write data may correspond to an amount obtained by subtracting the size of the buffer-programmed write data from the total size of the write data.

When the size of the write data exceeds the size of the write booster buffer WBB, the write controller 220 may transmit a buffer full signal LU_FULL for each logical unit LU to the write buffer manager 210. The write buffer manager 210 may count the number of saturations for each logical unit LU in response to the buffer full signal LU_FULL. The "saturation" means that the storage space of the write booster buffer WBB is filled with no remaining space by write data according to one write operation. The number of saturations means the number of times that write booster buffer WBB is saturated.

The write controller 220 may transmit, to the write buffer manager 210, an amount of write data not buffer-programmed to the write booster buffer WBB but normally programmed. Such amount of write data, which is normally programmed to the logic unit (LU) instead of being buffer-programmed to the write booster buffer WBB, is referred to as an overflow size. Upon receiving the overflow size information from the write controller 220, the write buffer manager 210 may accumulate an overflow size for each logical unit LU.

The migration component 230 may migrate the data programmed to the write booster buffer WBB to a corresponding logical unit LU according to a command from the host device 110 or various internal policies set by the controller 130.

As the write operation of the writer booster mode is repeated in response to a write request of the host device 110, a saturation count of a specific logical unit LU may reach a threshold value TH. When a logical unit LU, whose saturation count has reached the threshold value TH, is detected, the write buffer manager 210 may re-set the size of the write booster buffer WBB for each logical unit LU within the total buffer size TOTAL_WBB.

For example, the write buffer manager 210 may adjust the size of the write booster buffer WBB on the basis of a saturation count and an average overflow size for each logical unit LU. The average overflow size may be a size obtained by dividing an accumulated values of the overflow sizes for each logical unit LU by the number of saturations.

The order of adjusting the sizes of the write booster buffers WBB may be determined according to the saturation count. When the sizes of the write booster buffers WBB are sequentially adjusted, the adjustment amount may be controlled so that the adjusted buffer sizes are within a certain ratio of the allowable total buffer size. For example, the certain ratio could be ½ or less and thus the adjusted buffer size of a write booster buffer WB does not exceed ½ of the allowable total buffer size. Accordingly, all LUs set to use the dedicated write booster buffers WBB can have the write booster buffers WBB regardless of the order of adjusting the size of the write booster buffers WBB. Thus, even for a logic unit LU associated with a write booster buffer WBB whose order to adjust its size is relatively late, it is possible to proceed the size adjustment and allocate a certain size of the write booster buffer WBB for the logic unit LU even after the buffer size adjustment has been previously performed for another write booster buffer WBB whose order is relatively early.

Figure 6:
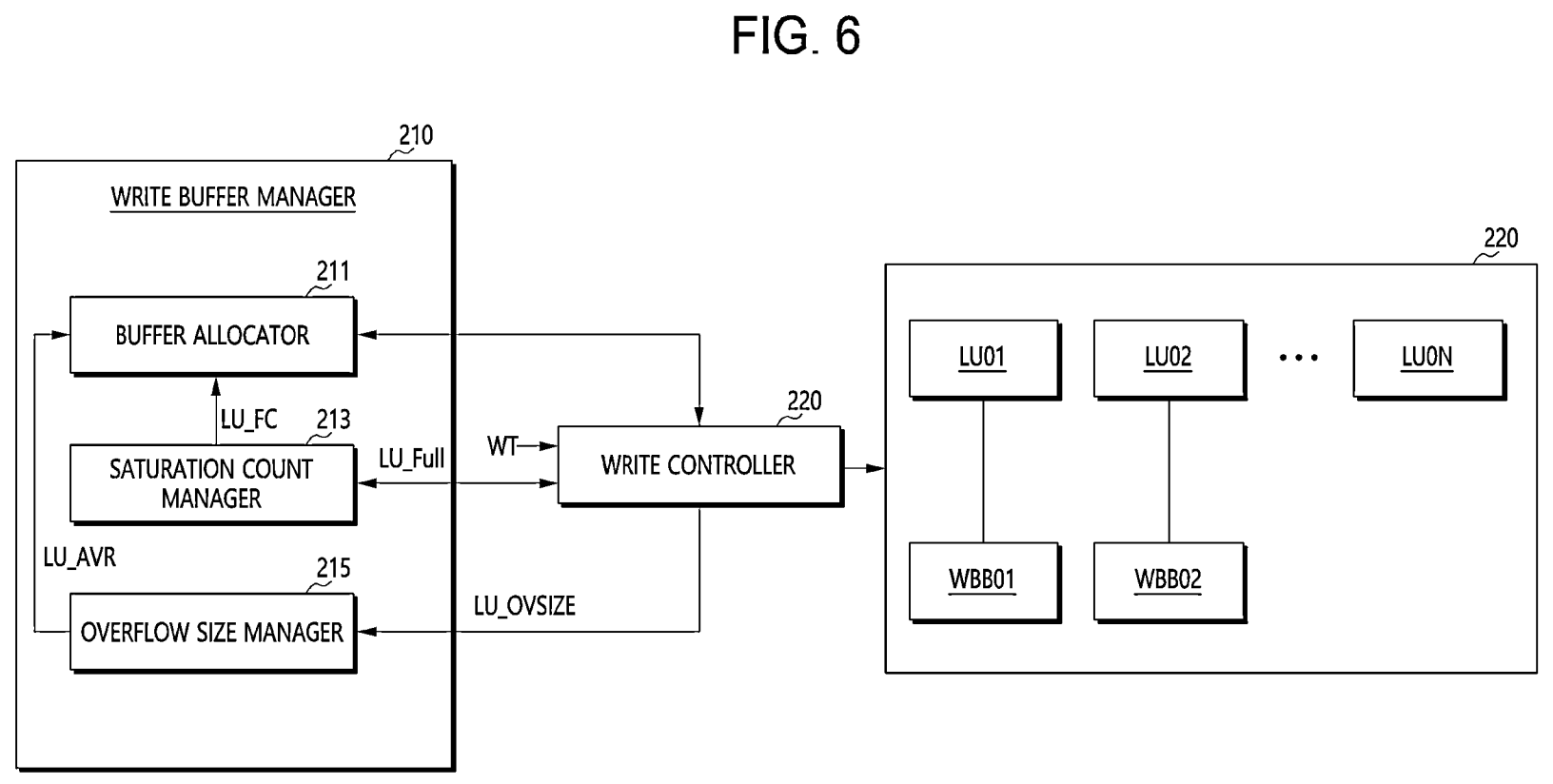

FIG. 6 is a diagram for explaining the write buffer manager 210 in accordance with an embodiment.

Referring to FIG. 6, the write buffer manager 210 may include a buffer allocator 211, a SATURATION COUNT MANAGER 213, and an OVERFLOW SIZE MANAGER 215.

The master device, for example, the host device 110 may divide the physical storage space of the storage unit 140 into one or more logical units LU after initialization and booting of the data storage device 120.

The buffer allocator 211 may set the buffer type and whether to activate the write booster mode under the control of the host device 110. When the dedicated buffer type is set, the buffer allocator 211 may determine which logical unit LU to set and which size (data storage capacity) of a write booster buffer WBB to be allocated to the set logical unit LU, under the control of the host device 110. The size of the write booster buffer for each logical unit LU may be determined within the allowable total buffer size TOTAL_WBB.

For example, the storage unit 140 may be divided into first to $N^{th}$ logical units LU01, LU02, . . . , and LU0N, and a first write booster buffer WBB01 having a first size may be allocated to the first logical unit LU01 and a second write booster buffer WBB02 having a second size may be allocated to the second logical unit LU02.

When the host device 110 transmits a write request and a write booster buffer WBB has been allocated to a corresponding logical unit LU, the write controller 220 may preferentially program write data to the write booster buffer WBB. When the size of the write data exceeds the size of the write booster buffer WBB, the write controller 220 may buffer-program some of the write data to the write booster buffer WBB and normally program the rest to the corresponding logical unit LU.

When the size of the write data exceeds the size of the write booster buffer WBB, the write controller 220 may transmit the buffer full signal LU_FULL for each logical unit LU to the SATURATION COUNT MANAGER 213. The SATURATION COUNT MANAGER 213 may transmit a saturation number count signal LU_FC for each logical unit LU to the buffer allocator 211 in response to the buffer full signal LU_FULL for each logical unit LU.

In addition, the write controller 220 may transmit an amount of write data not buffer-programmed but normally programmed to the write booster buffer WBB, that is, an overflow size LU_OVSIZE for each logical unit LU to the OVERFLOW SIZE MANAGER 215. The OVERFLOW SIZE MANAGER 215 may accumulate an overflow size for each logical unit LU in response thereto, calculate an average overflow size LU_AVR for each logical unit LU, and transmit the average overflow size LU_AVR to the buffer allocator 211.

When a logical unit LU, whose saturation number count signal LU_FC has reached the threshold value TH, is detected, the buffer allocator 211 may re-set the size of the write booster buffer WBB for each logical unit LU within the allowable total buffer size TOTAL_WBB on the basis of the saturation number count signal LU_FC for each logical unit LU and the average overflow size LU_AVR for each logical unit LU.

In an embodiment, the buffer allocator 211 may determine the order of adjusting the sizes of the write booster buffers WBB by sorting saturation counts in a descending order. When the sizes of the write booster buffers WBB are sequentially adjusted, the buffer allocator 211 may control the adjustment amount so that the adjusted buffer sizes are a part of the remaining buffer sizes, for example, ½ or less. Accordingly, all LUs set to use the dedicated write booster buffers WBB may be allocated the write booster buffers WBB even after the buffer size adjustment. After the size of the write booster buffer WBB of each logical unit LU is adjusted, a parameter value including the saturation number count signal LU_FC for each logical unit LU and the overflow size LU_OVSIZE for each logical unit LU may be reset. Accordingly, the data storage device 120 may flexibly adjust the sizes of the write booster buffers WBB on the basis of the workload of the host device 110 for each logical unit LU.

In an embodiment, the saturation number count signal LU_FC for each logical unit LU of the SATURATION COUNT MANAGER 213 and the average overflow size LU_AVR for each logical unit LU of the OVERFLOW SIZE MANAGER 215 may be transmitted to the host device 110.

When a logical unit LU, whose saturation number count signal LU_FC has reached the threshold value TH, is detected, the host device 110 may re-set the size of the write booster buffer WBB for each logical unit LU within the allowable total buffer size TOTAL_WBB on the basis of the saturation number count signal LU_FC for each logical unit LU and the average overflow size LU_AVR for each logical unit LU.

The controller 130 may receive a result of re-setting the sizes of the write booster buffers WBB from the host device 110, and change mapping information of the write booster buffers WBB for each logical unit LU.

Figure 7:
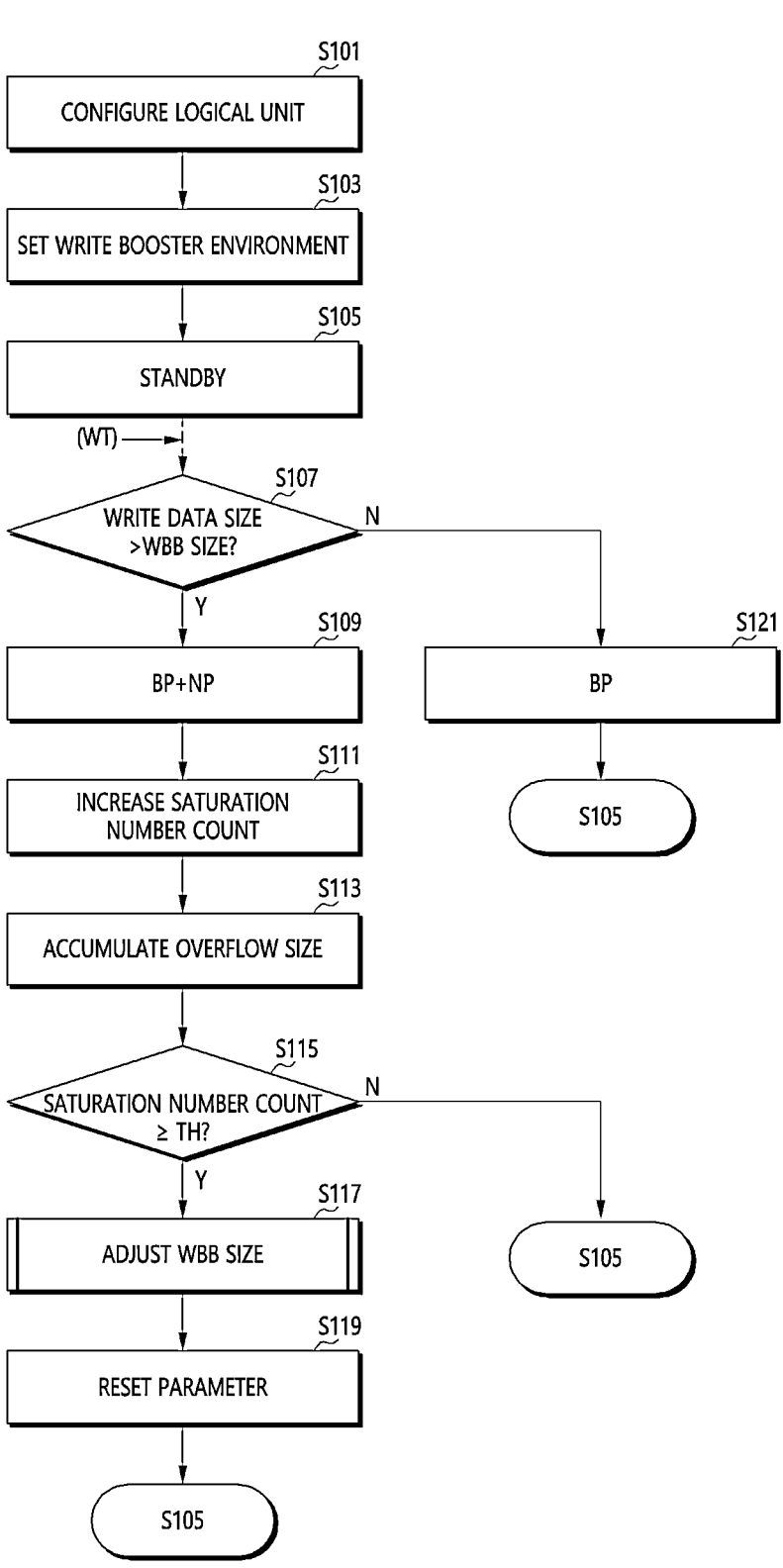
FIG. 7 is a flowchart for explaining an operating method of a data storage device in accordance with an embodiment of the disclosed technology.

FIG. 7 is a flowchart for explaining an operating method of the data storage device 120 in accordance with an embodiment.

The physical storage space of the storage unit 140 may be divided into one or more logical units LU by the host device 110 after initialization and booting of the data storage device 120 (S101).

The controller 130 of the data storage device 120 may set an environment including the buffer type and whether to activate the write booster mode under the control of the host device 110 (S103). For example, when the dedicated buffer type is set, the controller 130 may determine which logical unit LU to set and which size (data storage capacity) of a write booster buffer WBB to be allocated to a certain logical unit LU. The size of the write booster buffer for each logical unit LU may be determined within the allowable total buffer size TOTAL_WBB.

Then, when the host device 110 transmits a write request WT and the write booster buffer WBB has been allocated to a corresponding logical unit LU, the controller 130 may compare the size of write data with the size of the corresponding write booster buffer WBB (S107).

When the size of the write data is larger than that of the write booster buffer WBB (S107: Y), the controller 130 may buffer-program (BP) some of the write data to the write booster buffer WBB and normally program (NP) the rest to the corresponding logical unit LU (S109).

Then, the controller 130 may increase a saturation number count value for the corresponding logical unit LU (S111) and accumulate an overflow size for the corresponding logical unit LU (S113).

The controller 130 may compare the saturation number count value according to the result of step S111 with the threshold value TH (S115), and when a logical unit LU, whose saturation number count value has reached the threshold value TH, is detected (S115: Y), the controller 130 may re-set the size of the write booster buffer WBB for each logical unit LU within the allowable total buffer size (S117).

After the size of the write booster buffer WBB of each logical unit LU is adjusted, the controller 130 may reset a parameter value including the saturation number count for each logical unit LU and the overflow size for each logical unit LU (S119), and transition to a standby state (S105).

Meanwhile, when no logical unit LU, whose saturation number count value has reached the threshold value TH, is detected (S115: N), the controller 130 may transition to the standby state (S105).

When the size of write data is equal to or less than that of the write booster buffer WBB (S107: N), the controller 130 may perform a buffer programing (BP) operation of preferentially programming the write data to the write booster buffer WBB (S121), and transition to the standby state (S105).

Figure 8:
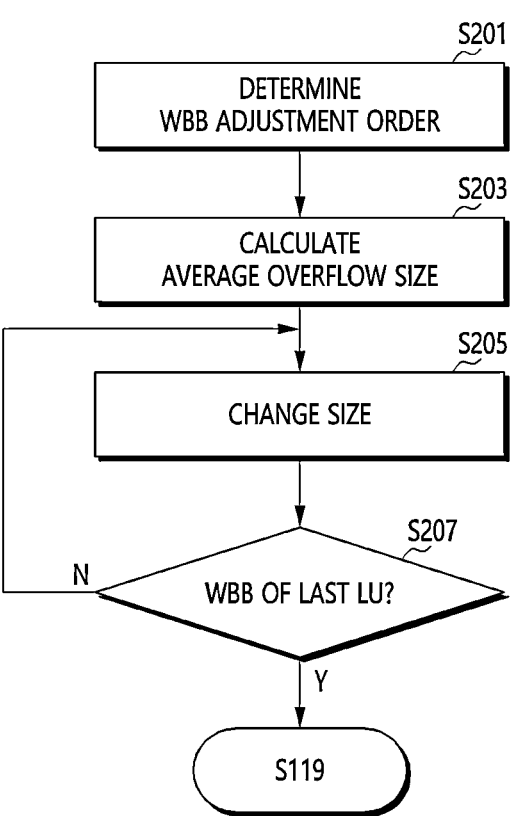
FIG. 8 is a flowchart for explaining a method for adjusting a buffer size in accordance with an embodiment of the disclosed technology.

FIG. 8 is a flowchart for explaining a method for adjusting a buffer size in accordance with an embodiment.

As illustrated in FIG. 7, when the logical unit LU, whose saturation number count value has reached the threshold value TH, is detected (S115: Y), the controller 130 may re-set the size of the write booster buffer WBB for each logical unit LU within the allowable total buffer size TOTAL_WBB on the basis of the saturation number count for each logical unit LU and the average overflow size for each logical unit LU.

Specifically, the controller 130 may determine the order of adjusting the sizes of the write booster buffers WBB by sorting the saturation counts for each write booster buffer WBB of the logical unit LU in a descending order (S201).

The controller 130 may calculate an average overflow size of a write booster buffer WBB to be adjusted, on the basis of the order determined in step S201 (S203). The average overflow size may correspond to a size obtained by dividing the accumulated value of the overflow size of the corresponding logical unit LU by a saturation number count.

The controller 130 may determine an adjustment amount so that the adjusted buffer size of the write booster buffer WBB to be adjusted is a part of the remaining buffer size, for example, ½ or less (S205). Accordingly, all LUs set to use the dedicated write booster buffers WBB may be allocated the write booster buffers WBB even after the buffer size adjustment.

When up to the size of the write booster buffer WBB of the last logical unit LU is completely adjusted according to the order determined in step S201 (S207), the controller 130 may reset the parameter as illustrated in FIG. 7 (S119).

Figure 9:
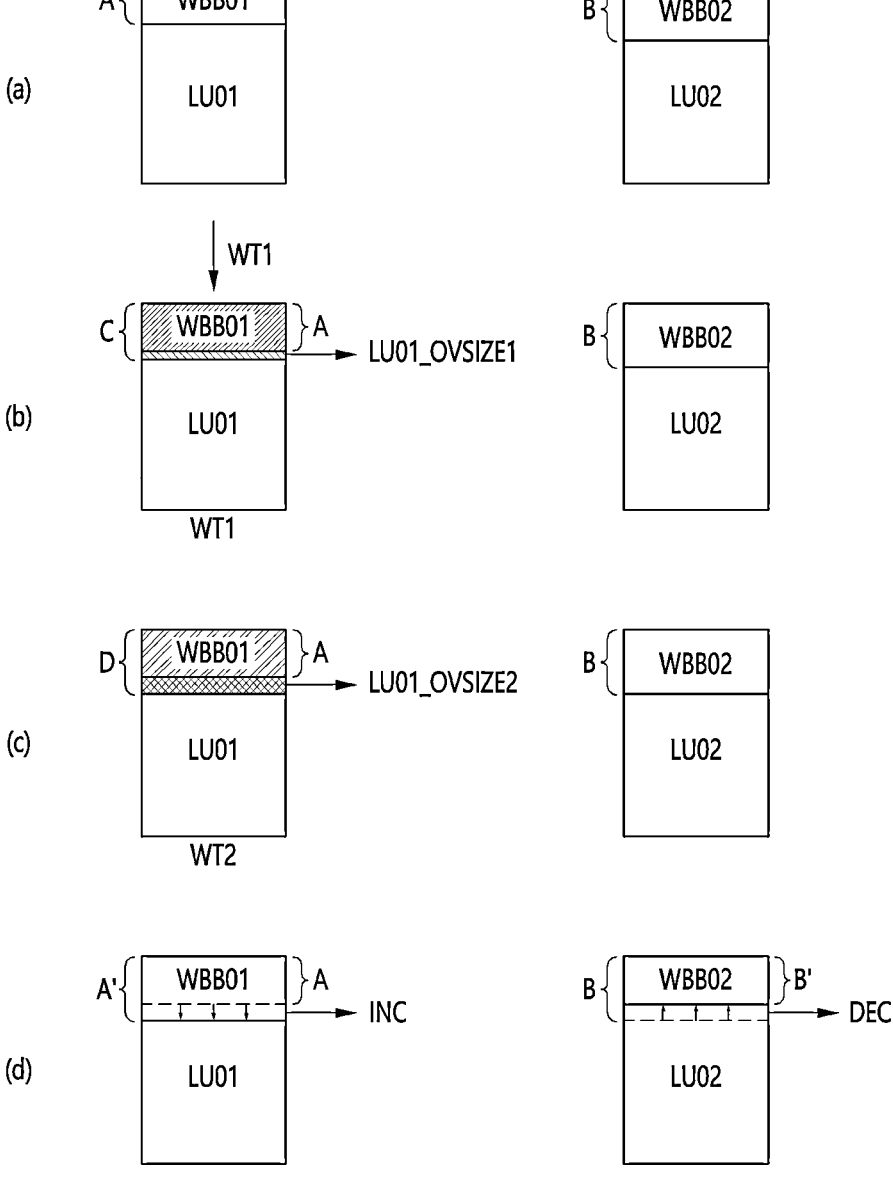
FIG. 9 is a conceptual diagram for explaining a method for adjusting a buffer size in accordance with an embodiment of the disclosed technology.

FIG. 9 is a diagram for explaining a method for adjusting a buffer size in accordance with an embodiment.

The storage unit 140 may be divided into the first to $N^{th}$ logical units LU01, LU02, . . . , and LU0N.

As illustrated in (a) of FIG. 9, it is assumed that a first dedicated write booster buffer WBB01 having a first size A is allocated to the first logical unit LU01, and a second dedicated write booster buffer WBB02 having a second size B is allocated to the second logical unit LU02.

When the host device 110 transmits a first write request WT1 for programming first write data having a size C (>A) to the first logical unit LU01, some (size A) of the first write data is buffer-programmed (BP) to the first write booster buffer WBB01, but the rest (size LU01_OVSIZE1) is normally programmed (NP) to the first logical unit LU01 as illustrated in (b) of FIG. 9.

Accordingly, a saturation number count for the first logical unit LU01 increases and the overflow size LU01_OVSIZE1 is accumulated.

When the host device 110 transmits a second write request WT2 for programming second write data having a size D (>A) to the first logical unit LU01, some (size A) of the second write data is buffer-programmed (BP) to the first write booster buffer WBB01, but the rest (size LU01_OVSIZE2) is normally programmed (NP) to the first logical unit LU01 as illustrated in (c) of FIG. 9.

Accordingly, the saturation number count for the first logical unit LU01 increases and the overflow size LU01_OVSIZE2 is accumulated.

When the saturation number count for the first logical unit LU01 reaches the threshold value TH, the sizes of the write booster buffers WBB are sequentially adjusted for each logical unit LU.

As illustrated in (d) of FIG. 9, the first write booster buffer WBB01 allocated to the first logical unit LU01 may have a size A' adjusted by adding an increment INC to the initial size A. The second write booster buffer WBB02 allocated to the second logical unit LU02 may have a size B' adjusted by subtracting a decrement DEC from the initial size B.

The disclosed technology may flexibly adjust the sizes of the write booster buffers WBB on the basis of the workload of the host device 110 for each logical unit LU, thereby maximally exhibiting high-speed write performance.

Figure 10:
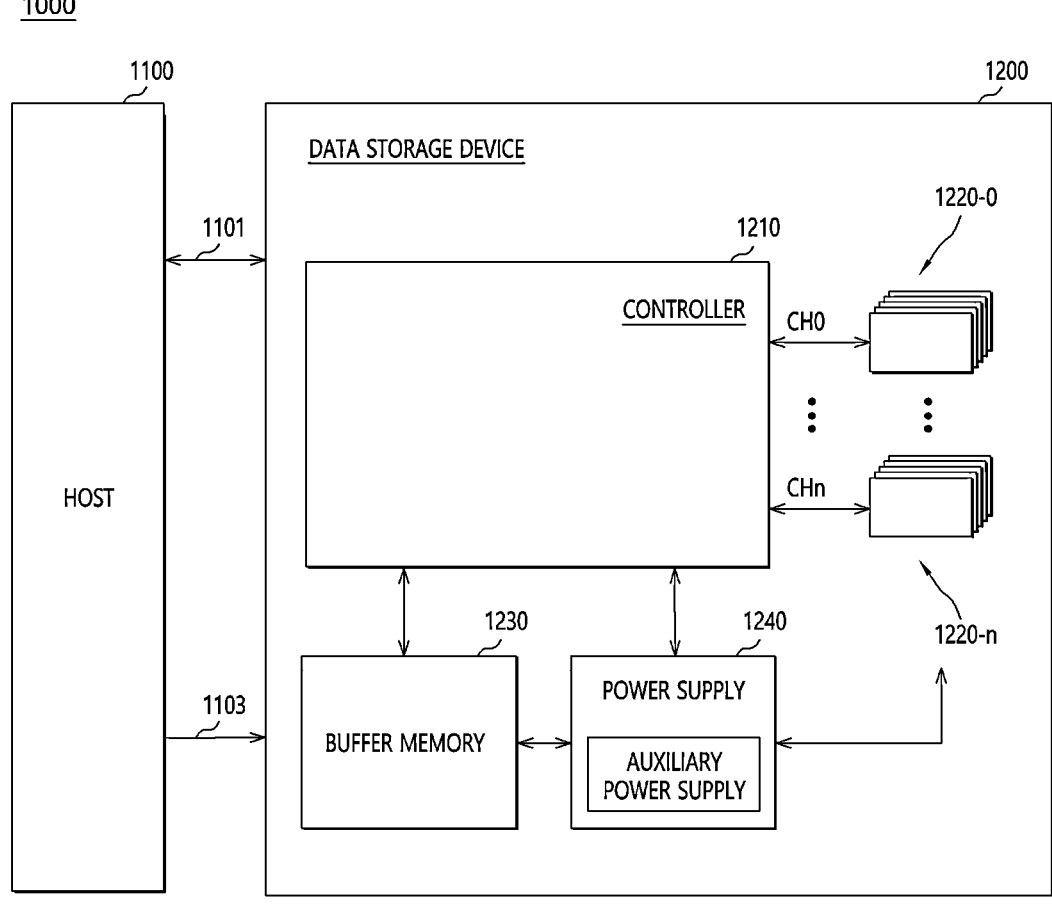
FIG. 10 is a diagram illustrating a data storage system in accordance with an embodiment of the disclosed technology.

FIG. 10 is a diagram illustrating a data storage system 1000, in accordance with an embodiment.

Referring to FIG. 10, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 11:
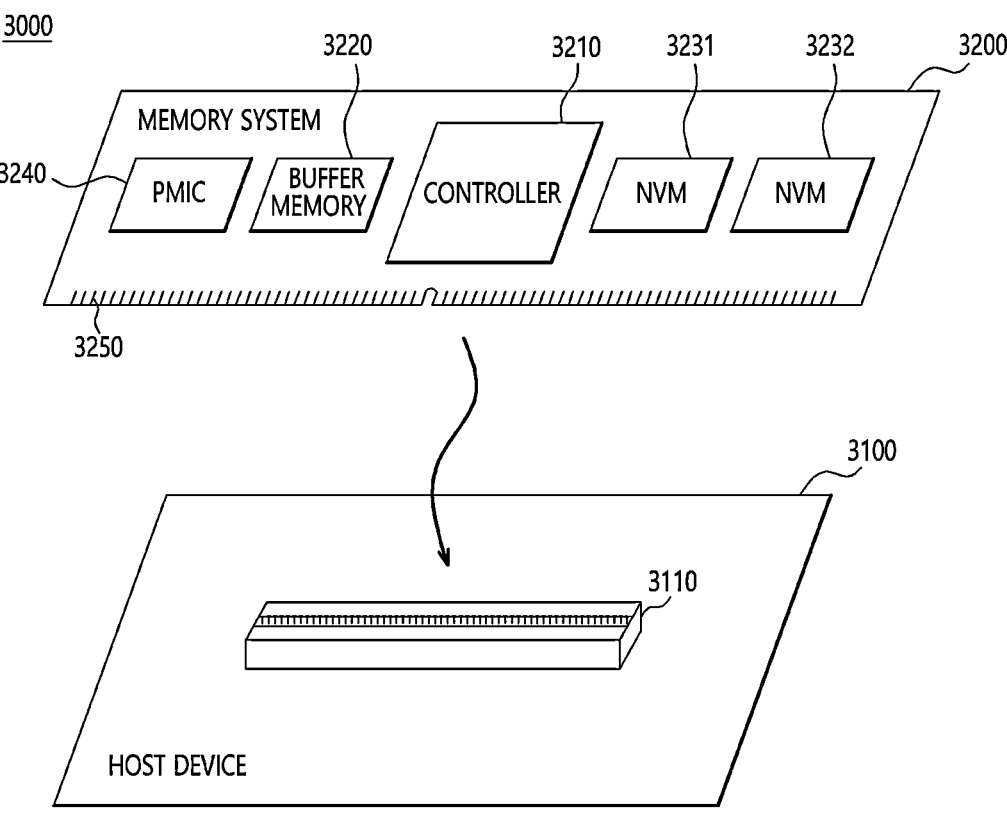
FIG. 11 and FIG. 12 are diagrams illustrating a data processing system in accordance with an embodiment of the disclosed technology.

FIG. 11 is a diagram illustrating a data processing system 3000, in accordance with an embodiment. Referring to FIG. 11, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 12:
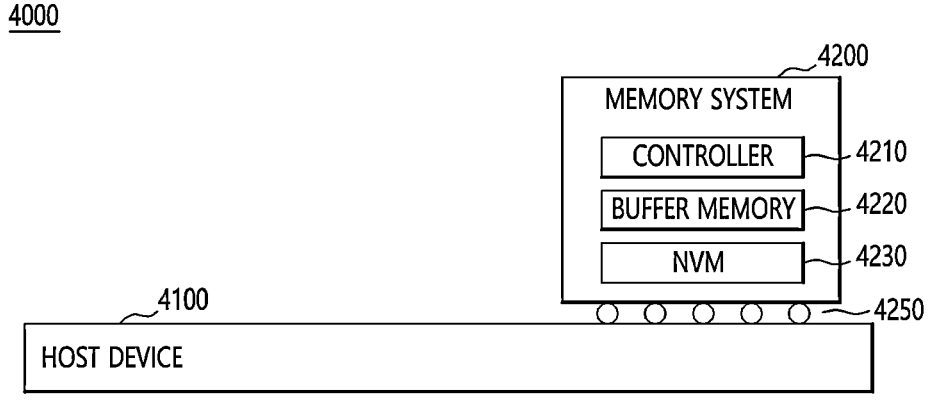

FIG. 12 is a diagram illustrating a data processing system 4000 in accordance with an embodiment. Referring to FIG. 12, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 13:
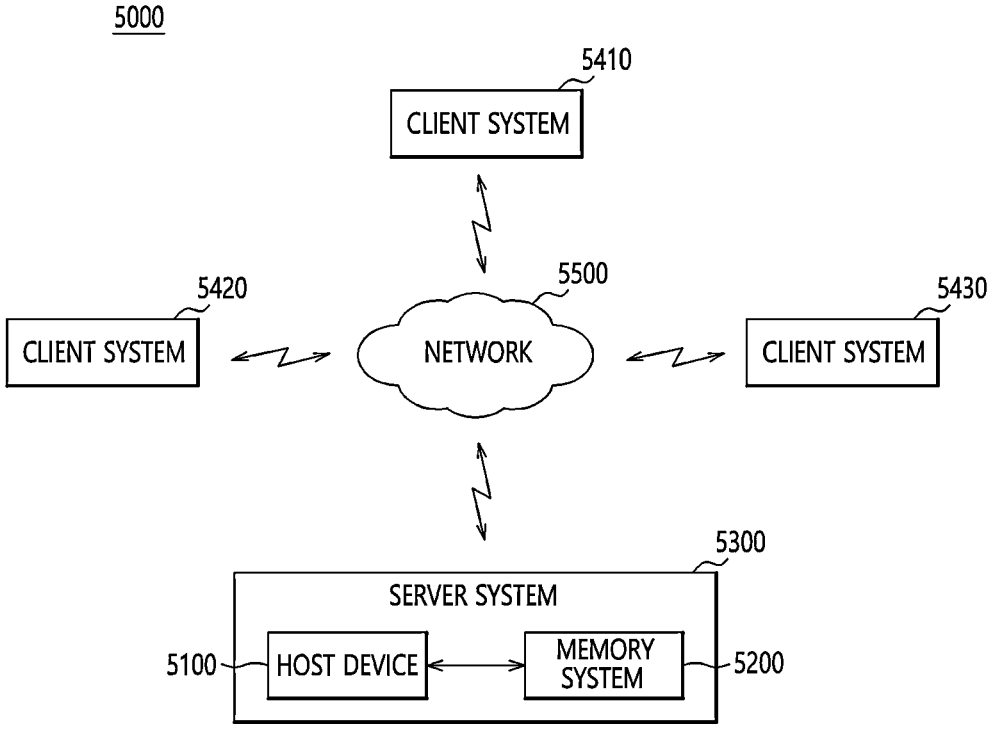
FIG. 13 is a diagram illustrating a network system including a data storage device in accordance with an embodiment of the disclosed technology.

FIG. 13 is a diagram illustrating a network system 5000 including a data storage device, in accordance with an embodiment. Referring to FIG. 13, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 10, the memory system 3200 shown in FIG. 11, or the memory system 4200 shown in FIG. 12.

Figure 14:
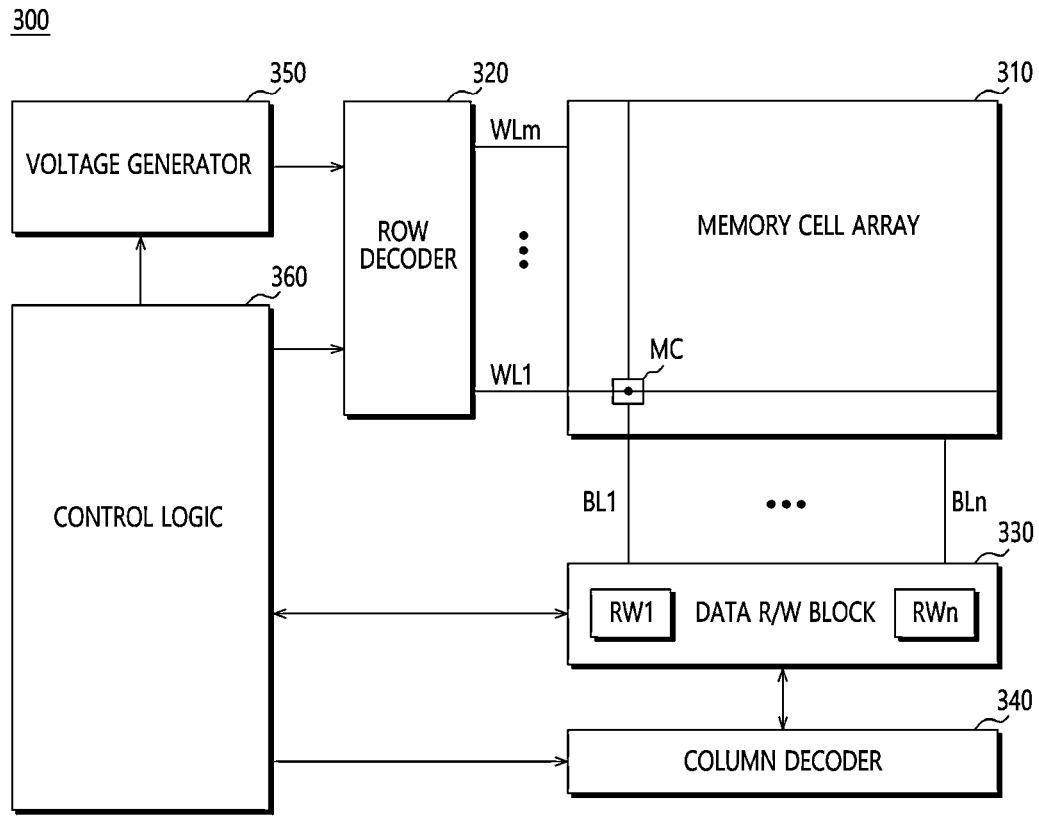
FIG. 14 is a block diagram illustrating a nonvolatile memory device included in a data storage device in accordance with an embodiment of the disclosed technology.

FIG. 14 is a block diagram illustrating a nonvolatile memory device 300 included in a data storage device, such as the data storage device 10, in accordance with an embodiment. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only and various modifications and improvements of the disclosed embodiments and other embodiments can be made based on what is described and/or illustrated in this patent document.

What is claimed is:

1. A data storage device comprising:
   a storage unit configured to store data and including a plurality of storage areas; and
   a controller in communication with the storage unit and configured to program write data to a first area as at least one of the plurality of storage areas with a priority over a second area as at least one of the plurality of storage areas,
   wherein the second area includes a plurality of logical units and the first area includes buffer areas associated with each of the logical units respectively,
   wherein the controller is further configured to adjust a size of the buffer areas so that the adjusted size of the buffer areas is less than or equal to a part of a remaining size of the first area.

2. The data storage device according to claim 1, wherein the controller is further configured to transfer the write data of the first area to the second area.

3. The data storage device according to claim 1, wherein the controller is configured to adjust the size of the buffer areas based on a number of times saturated by the write data for each of the buffer area, a saturation occurring due to a size of the write data written to a certain buffer area being greater than a certain size.

4. The data storage device according to claim 3, wherein the controller is configured to adjust the size of the buffer areas based on an overflow size of the write data corresponding to a difference between the size of the write data and the certain size.

5. The data storage device according to claim 3, wherein the controller is further configured to program the write data in the buffer areas and accumulate overflow size of each buffer area, an overflow size of each the buffer area corresponding to a difference between a size of each buffer area and the corresponding write data.

6. The data storage device according to claim 5, wherein the buffer areas have a same size or different sizes from each other before an adjustment of the size on the buffer areas.

7. The data storage device according to claim 3, wherein the controller is further configured to monitor a number of saturations for each buffer area and adjust a size of at least one of the buffer areas upon detecting the number of saturations reaching a threshold value.

8. The data storage device according to claim 7, wherein the controller is further configured to determine, in response to detecting multiple buffer areas, each having the number of saturations reaching the threshold value, an order for adjusting sizes of the multiple buffer areas.

9. The data storage device according to claim 1, wherein at least some of the plurality of logical units is high-speed program units configured to store data in a higher speed as compared to remaining logic units, and the buffer areas is configured to store the write data associated with the logical unit.

10. The data storage device according to claim 1, wherein a number of bits storable per cell of the first area is configured to be smaller than a number of bits storable per cell of the second area.

11. A data storage device comprising:
   a storage area including logical areas and buffer areas associated with the logical areas; and
   a controller in communication with a host device to receive a request to write data for the logical areas and configured to program the data in the buffer areas with a priority over the logical areas and change a size of a buffer area in the buffer areas so that the changed size of the buffer area is less than or equal to a part of a remaining size of the buffer areas.

12. The data storage device according to claim 11, wherein the controller is configured to change the size of the buffer area based on a number of times of saturations that a corresponding data programmed to the buffer area has a size exceeding the size of the buffer area.

13. The data storage device according to claim 12, wherein the controller is further configured to monitor the number of times of saturations for each buffer area and change the size of the buffer area whose number of times of saturations reaches a threshold value.

14. The data storage device according to claim 12, wherein the controller is further configured to determine, in response to detecting multiple buffer areas, each having the number of times of saturations reaching a threshold value, an order for adjusting sizes of the multiple buffer areas.

15. The data storage device according to claim 12, wherein the controller is configured to change the size of the buffer area further based on a difference between the corresponding data to be program to the buffer area and the size of the buffer area.

16. The data storage device according to claim 11, wherein a number of bits storable per cell of the buffer areas is configured to be smaller than a number of bits storable per cell of the logical areas.

17. The data storage device according to claim 11, wherein the controller is further configured to transfer the write data of the buffer areas to the logical areas.

18. The data storage device according to claim 12, wherein the controller is further configured to program the write data in the buffer areas and accumulate a difference between a size of each buffer area and the corresponding write data.

19. The data storage device according to claim 18, wherein the controller is further configured to change the size of the buffer area based on the number of saturations and an average value of overflow sizes.

\* \* \* \* \*